(12) United States Patent
Markuze et al.

(10) Patent No.: US 11,363,124 B2
(45) Date of Patent: Jun. 14, 2022

(54) ZERO COPY SOCKET SPLICING

(71) Applicant: VMware, Inc., Palo Alto, CA (US)

(72) Inventors: Alex Markuze, Ramat Gan (IL); Chen Dar, Magshimim (IL); Aran Bergman, Givatayim (IL); Igor Golikov, Kfar Saba (IL); Israel Cidon, San Francisco, CA (US); Eyal Zohar, Shimshit (IL)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/085,916

(22) Filed: Oct. 30, 2020

(65) Prior Publication Data
US 2022/0038557 A1 Feb. 3, 2022

Related U.S. Application Data

(60) Provisional application No. 63/059,113, filed on Jul. 30, 2020.

(51) Int. Cl.
*H04L 69/16* (2022.01)
*H04L 49/90* (2022.01)
*H04L 47/30* (2022.01)
*H04L 47/193* (2022.01)

(52) U.S. Cl.
CPC .......... *H04L 69/162* (2013.01); *H04L 47/193* (2013.01); *H04L 47/30* (2013.01); *H04L 49/9089* (2013.01)

(58) Field of Classification Search
CPC . H04L 69/162; H04L 47/193; H04L 49/9089; H04L 47/30; H04L 65/1069; G06F 13/128
See application file for complete search history.

(56) References Cited

U.S. PATENT DOCUMENTS

| 5,652,751 | A | 7/1997 | Sharony |
| 5,909,553 | A | 6/1999 | Campbell et al. |
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |

(Continued)

FOREIGN PATENT DOCUMENTS

| CN | 104956329 A | 9/2015 |
| EP | 1912381 A1 | 4/2008 |

(Continued)

OTHER PUBLICATIONS

Non-Published Commonly Owned U.S. Appl. No. 17/233,427, filed Apr. 16, 2021, 124 pages, VMware, Inc.

(Continued)

*Primary Examiner* — Kiet Tang
(74) *Attorney, Agent, or Firm* — Adeli LLP

(57) ABSTRACT

Some embodiments provide a novel method for splicing Transmission Control Protocol (TCP) sockets on a computing device that processes a kernel of an operating system. The method receives a set of packets at a first TCP socket of the kernel. The method stores the set of packets at a kernel memory location sends the set of packets directly from the kernel memory location out through a second TCP socket of the kernel.

14 Claims, 10 Drawing Sheets

(56) References Cited

U.S. PATENT DOCUMENTS

| | | |
|---|---|---|
| 6,976,087 B1 | 12/2005 | Westfall et al. |
| 7,003,481 B2 | 2/2006 | Banka et al. |
| 7,280,476 B2 | 10/2007 | Anderson |
| 7,313,629 B1 | 12/2007 | Nucci et al. |
| 7,320,017 B1 | 1/2008 | Kurapati et al. |
| 7,373,660 B1 | 5/2008 | Guichard et al. |
| 7,581,022 B1 | 8/2009 | Griffin et al. |
| 7,680,925 B2 | 3/2010 | Sathyanarayana et al. |
| 7,681,236 B2 | 3/2010 | Tamura et al. |
| 7,962,458 B2 | 6/2011 | Holenstein et al. |
| 8,094,575 B1 | 1/2012 | Vadlakonda et al. |
| 8,094,659 B1 | 1/2012 | Arad |
| 8,111,692 B2 | 2/2012 | Ray |
| 8,141,156 B1 | 3/2012 | Mao et al. |
| 8,224,971 B1 | 7/2012 | Miller et al. |
| 8,228,928 B2 | 7/2012 | Parandekar et al. |
| 8,243,589 B1 | 8/2012 | Trost et al. |
| 8,259,566 B2 | 9/2012 | Chen et al. |
| 8,274,891 B2 | 9/2012 | Averi et al. |
| 8,301,749 B1 | 10/2012 | Finklestein et al. |
| 8,385,227 B1 | 2/2013 | Downey |
| 8,566,452 B1 | 10/2013 | Goodwin et al. |
| 8,630,291 B2 | 1/2014 | Shaffer et al. |
| 8,661,295 B1 | 2/2014 | Khanna et al. |
| 8,724,456 B1 | 5/2014 | Hong et al. |
| 8,724,503 B2 | 5/2014 | Johnsson et al. |
| 8,745,177 B1 | 6/2014 | Kazerani et al. |
| 8,799,504 B2 | 8/2014 | Capone et al. |
| 8,804,745 B1 | 8/2014 | Sinn |
| 8,806,482 B1 | 8/2014 | Nagargadde et al. |
| 8,856,339 B2 | 10/2014 | Mestery et al. |
| 8,964,548 B1 | 2/2015 | Keralapura et al. |
| 8,989,199 B1 | 3/2015 | Sella et al. |
| 9,009,217 B1 | 4/2015 | Nagargadde et al. |
| 9,055,000 B1 | 6/2015 | Ghosh et al. |
| 9,060,025 B2 | 6/2015 | Xu |
| 9,071,607 B2 | 6/2015 | Twitchell, Jr. |
| 9,075,771 B1 | 7/2015 | Gawali et al. |
| 9,135,037 B1 | 9/2015 | Petrescu-Prahova et al. |
| 9,137,334 B2 | 9/2015 | Zhou |
| 9,154,327 B1 | 10/2015 | Marino et al. |
| 9,203,764 B2 | 12/2015 | Shirazipour et al. |
| 9,306,949 B1 | 4/2016 | Richard et al. |
| 9,323,561 B2 | 4/2016 | Ayala et al. |
| 9,336,040 B2 | 5/2016 | Dong et al. |
| 9,354,983 B1 | 5/2016 | Yenamandra et al. |
| 9,356,943 B1 | 5/2016 | Lopilato et al. |
| 9,379,981 B1 | 6/2016 | Zhou et al. |
| 9,413,724 B2 | 8/2016 | Xu |
| 9,419,878 B2 | 8/2016 | Hsiao et al. |
| 9,432,245 B1 | 8/2016 | Sorenson et al. |
| 9,438,566 B2 | 9/2016 | Zhang et al. |
| 9,450,817 B1 | 9/2016 | Bahadur et al. |
| 9,450,852 B1 | 9/2016 | Chen et al. |
| 9,462,010 B1 | 10/2016 | Stevenson |
| 9,467,478 B1 | 10/2016 | Khan et al. |
| 9,485,163 B1 | 11/2016 | Fries et al. |
| 9,521,067 B2 | 12/2016 | Michael et al. |
| 9,525,564 B2 | 12/2016 | Lee |
| 9,559,951 B1 | 1/2017 | Sajassi et al. |
| 9,563,423 B1 | 2/2017 | Pittman |
| 9,602,389 B1 | 3/2017 | Maveli et al. |
| 9,608,917 B1 | 3/2017 | Anderson et al. |
| 9,608,962 B1 | 3/2017 | Chang |
| 9,621,460 B2 | 4/2017 | Mehta et al. |
| 9,641,551 B1 | 5/2017 | Kariyanahalli |
| 9,665,432 B2 | 5/2017 | Kruse et al. |
| 9,686,127 B2 | 6/2017 | Ramachandran et al. |
| 9,715,401 B2 | 7/2017 | Devine et al. |
| 9,717,021 B2 | 7/2017 | Hughes et al. |
| 9,722,815 B2 | 8/2017 | Mukundan et al. |
| 9,747,249 B2 | 8/2017 | Cherian et al. |
| 9,755,965 B1 | 9/2017 | Yadav et al. |
| 9,787,559 B1 | 10/2017 | Schroeder |
| 9,807,004 B2 | 10/2017 | Koley et al. |
| 9,819,540 B1 | 11/2017 | Bahadur et al. |
| 9,819,565 B2 | 11/2017 | Djukic et al. |
| 9,825,822 B1 | 11/2017 | Holland |
| 9,825,911 B1 | 11/2017 | Brandwine |
| 9,825,992 B2 | 11/2017 | Xu |
| 9,832,128 B1 | 11/2017 | Ashner et al. |
| 9,832,205 B2 | 11/2017 | Santhi et al. |
| 9,875,355 B1 | 1/2018 | Williams |
| 9,906,401 B1 | 2/2018 | Rao |
| 9,930,011 B1 | 3/2018 | Clemons, Jr. et al. |
| 9,935,829 B1 | 4/2018 | Miller et al. |
| 9,942,787 B1 | 4/2018 | Tillotson |
| 9,996,370 B1 | 6/2018 | Khafizov et al. |
| 10,038,601 B1 | 7/2018 | Becker et al. |
| 10,057,183 B2 | 8/2018 | Salle et al. |
| 10,057,294 B2 | 8/2018 | Xu |
| 10,135,789 B2 | 11/2018 | Mayya et al. |
| 10,142,226 B1 | 11/2018 | Wu et al. |
| 10,178,032 B1 | 1/2019 | Freitas |
| 10,187,289 B1 | 1/2019 | Chen et al. |
| 10,229,017 B1 | 3/2019 | Zou et al. |
| 10,237,123 B2 | 3/2019 | Dubey et al. |
| 10,250,498 B1 | 4/2019 | Bales et al. |
| 10,263,832 B1 | 4/2019 | Ghosh |
| 10,320,664 B2 | 6/2019 | Nainar et al. |
| 10,320,691 B1 | 6/2019 | Matthews et al. |
| 10,326,830 B1 | 6/2019 | Singh |
| 10,348,767 B1 | 7/2019 | Lee et al. |
| 10,355,989 B1 | 7/2019 | Panchal et al. |
| 10,425,382 B2 | 9/2019 | Mayya et al. |
| 10,454,708 B2 | 10/2019 | Mibu |
| 10,454,714 B2 | 10/2019 | Mayya et al. |
| 10,461,993 B2 | 10/2019 | Turabi et al. |
| 10,498,652 B2 | 12/2019 | Mayya et al. |
| 10,511,546 B2 | 12/2019 | Singarayan et al. |
| 10,523,539 B2 | 12/2019 | Mayya et al. |
| 10,550,093 B2 | 2/2020 | Ojima et al. |
| 10,554,538 B2 | 2/2020 | Spohn et al. |
| 10,560,431 B1 | 2/2020 | Chen et al. |
| 10,565,464 B2 | 2/2020 | Han et al. |
| 10,567,519 B1 | 2/2020 | Mukhopadhyaya et al. |
| 10,574,528 B2 | 2/2020 | Mayya et al. |
| 10,594,516 B2 | 3/2020 | Cidon et al. |
| 10,594,659 B2 | 3/2020 | El-Moussa et al. |
| 10,608,844 B2 | 3/2020 | Cidon et al. |
| 10,637,889 B2 | 4/2020 | Ermagan et al. |
| 10,666,460 B2 | 5/2020 | Cidon et al. |
| 10,686,625 B2 | 6/2020 | Cidon et al. |
| 10,749,711 B2 | 8/2020 | Mukundan et al. |
| 10,778,466 B2 | 9/2020 | Cidon et al. |
| 10,778,528 B2 | 9/2020 | Mayya et al. |
| 10,805,114 B2 | 10/2020 | Cidon et al. |
| 10,805,272 B2 | 10/2020 | Mayya et al. |
| 10,819,564 B2 | 10/2020 | Turabi et al. |
| 10,826,775 B1 | 11/2020 | Moreno et al. |
| 10,841,131 B2 | 11/2020 | Cidon et al. |
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |

(56) References Cited

U.S. PATENT DOCUMENTS

| | | |
|---|---|---|
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1* | 3/2003 | Hathaway ........... G06F 13/4059 709/202 |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1* | 7/2007 | Chu .................... G06F 13/128 710/22 |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0300615 A1 | 11/2012 | Kempf et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |

(56) References Cited

U.S. PATENT DOCUMENTS

| | | |
|---|---|---|
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1* | 11/2015 | Rader ............... H04L 47/193 709/233 |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0363221 A1 | 12/2015 | Terayama et al. |
| 2015/0363733 A1 | 12/2015 | Brown |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0218951 A1 | 7/2016 | Masseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0048296 A1* | 2/2017 | Ramalho ............. H04L 65/1069 |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |

(56) References Cited

U.S. PATENT DOCUMENTS

| | | |
|---|---|---|
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0295264 A1* | 10/2017 | Touitou ................ H04L 69/162 |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0374174 A1 | 12/2017 | Evens et al. |
| 2018/0006995 A1 | 1/2018 | Bickhart et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153736 A1 | 5/2020 | Liebherr et al. |
| 2020/0169473 A1 | 5/2020 | Rimar et al. |
| 2020/0177503 A1 | 6/2020 | Hooda et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |

(56) References Cited

U.S. PATENT DOCUMENTS

| | | |
|---|---|---|
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322287 A1 | 10/2020 | Connor et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0105199 A1 | 4/2021 | H et al. |
| 2021/0112034 A1 | 4/2021 | Sundararajan et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | H et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1* | 9/2021 | Salgaonkar ........... G06F 9/4408 |
| 2021/0328835 A1 | 10/2021 | Mayya et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |

FOREIGN PATENT DOCUMENTS

| | | |
|---|---|---|
| EP | 3041178 A1 | 7/2016 |
| EP | 3509256 A1 | 7/2019 |
| RU | 2574350 C2 | 2/2016 |
| WO | 03073701 | 9/2003 |
| WO | 2012167184 A2 | 12/2012 |
| WO | 2016061546 A1 | 4/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |

OTHER PUBLICATIONS

Non-Published Commonly Owned U.S. Appl. No. 17/361,292, filed Jun. 28, 2021, 35 pages, Nicira, Inc.

Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.

Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Non-published Commonly Owned U.S. Appl. No. 17/187,913, filed Mar. 1, 2021, 27 pages, Nicira, Inc.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned U.S. Appl. No. 16/662,363, filed Oct. 24, 2019, 129 pages, VMware, Inc.

Non-Published Commonly Owned U.S. Appl. No. 16/662,379, filed Oct. 24, 2019, 123 pages, VMware, Inc.

Non-Published Commonly Owned U.S. Appl. No. 16/662,402, filed Oct. 24, 2019, 128 pages, VMware, Inc.

Non-Published Commonly Owned U.S. Appl. No. 16/662,427, filed Oct. 24, 2019, 165 pages, VMware, Inc.

Non-Published Commonly Owned U.S. Appl. No. 16/662,489, filed Oct. 24, 2019, 165 pages, VMware, Inc.

Non-Published Commonly Owned U.S. Appl. No. 16/662,510, filed Oct. 24, 2019, 165 pages, VMware, Inc.

Non-Published Commonly Owned U.S. Appl. No. 16/662,531, filed Oct. 24, 2019, 135 pages, VMware, Inc.

Non-Published Commonly Owned U.S. Appl. No. 16/662,570, filed Oct. 24, 2019, 141 pages, VMware, Inc.

Non-Published Commonly Owned U.S. Appl. No. 16/662,587, filed Oct. 24, 2019, 145 pages, VMware, Inc.

Non-Published Commonly Owned U.S. Appl. No. 16/662,591, filed Oct. 24, 2019, 130 pages, VMware, Inc.

Non-Published Commonly Owned U.S. Appl. No. 16/721,964, filed Dec. 20, 2019, 39 pages, VMware, Inc.

(56) References Cited

OTHER PUBLICATIONS

Non-Published Commonly Owned U.S. Appl. No. 16/721,965, filed Dec. 20, 2019, 39 pages, VMware, Inc.
Non-Published Commonly Owned U.S. Appl. No. 16/792,908, filed Feb. 18, 2020, 48 pages, VMware, Inc.
Non-Published Commonly Owned U.S. Appl. No. 16/792,909, filed Feb. 18, 2020, 49 pages, VMware, Inc.
Non-Published Commonly Owned U.S. Appl. No. 16/851,294, filed Apr. 17, 2020, 59 pages, VMware, Inc.
Non-Published Commonly Owned U.S. Appl. No. 16/851,301, filed Apr. 17, 2020, 59 pages, VMware, Inc.
Non-Published Commonly Owned U.S. Appl. No. 16/851,308, filed Apr. 17, 2020, 59 pages, VMware, Inc.
Non-Published Commonly Owned U.S. Appl. No. 16/851,314, filed Apr. 17, 2020, 59 pages, VMware, Inc.
Non-Published Commonly Owned U.S. Appl. No. 16/851,323, filed Apr. 17, 2020, 59 pages, VMware, Inc.
Non-Published Commonly Owned U.S. Appl. No. 16/851,397, filed Apr. 17, 2020, 59 pages, VMware, Inc.
Non-Published Commonly Owned U.S. Appl. No. 17/068,603, filed Oct. 12, 2020, 37 pages, Nicira, Inc.
Non-Published Commonly Owned U.S. Appl. No. 17/072,764, filed Oct. 16, 2020, 33 pages, VMware, Inc.
Non-Published Commonly Owned U.S. Appl. No. 17/072,774, filed Oct. 16, 2020, 34 pages, VMware, Inc.
Non-Published Commonly Owned Related U.S. Appl. No. 17/085,893 with similar specification, filed Oct. 30, 2020, 34 pages, VMware, Inc.
Non-Published Commonly Owned U.S. Appl. No. 15/803,964, filed Nov. 6, 2017, 15 pages, The Mode Group.
Non-Published Commonly Owned U.S. Appl. No. 16/216,235, filed Dec. 11, 2018, 19 pages, The Mode Group.
Non-Published Commonly Owned U.S. Appl. No. 16/818,862, filed Mar. 13, 2020, 198 pages, The Mode Group.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Guo, Xiangyi, et al., U.S. Appl. No. 62/925,193, filed Oct. 23, 2019, 26 pages.
Lasserre, Marc, et al., "Framework for Data Center (DC) Network Virtualization," RFC 7365, Oct. 2014, 26 pages, IETF.
Lin, Weidong, et al., "Using Path Label Routing in Wide Area Software-Defined Networks with Open Flow," 2016 International Conference on Networking and Network Applications, Jul. 2016, 6 pages, IEEE.
Non-Published Commonly Owned U.S. Appl. No. 17/467,378, filed Sep. 6, 2021, 157 pages, VMware, Inc.
Non-Published Commonly Owned U.S. Appl. No. 17/474,034, filed Sep. 13, 2021, 349 pages, VMware, Inc.
Non-Published Commonly Owned U.S. Appl. No. 17/542,413, filed Dec. 4, 2021, 173 pages, VMware, Inc.
Cox, Jacob H., et al., "Advancing Software-Defined Networks: A Survey," IEEE Access, Oct. 12, 2017, 40 pages. vol. 5, IEEE, retrieved from https://ieeexplore.ieee.org/document/8066287.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.eom/c/dam/r/ciscolive/emea/docs/2020/pdf/BRKRST-2558.pdf.
Barozei, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

* cited by examiner

ZERO COPY SOCKET SPLICING

BACKGROUND

In the field of computing, data transfers from one computer to another take up a significant amount of computing time. One of the processes that make this problem worse is that in some operations, such as virtual computing, data may need to be accessed by multiple separate processes on a particular physical machine (e.g., a host machine of a data center, standalone computer, etc.). In the prior art, different processes may each need their own copy of a set of data. In such circumstances, data used by multiple processes on the same machine will be copied, sometimes multiple times, from one memory location (accessible by a first process) to another memory location (accessible to a second process) on the same machine. Such copying may slow down the transmission and/or processing of the data. For example, in a prior art socket splicing operation, incoming data on a receiving socket is copied from a first memory location used by a receiving socket, to a second, intermediary memory location. The data is then copied from the intermediate memory location to a third memory location used by a transmitting socket. Each additional copy operation slows down the transmission of the data.

In some of the prior art, Berkeley Sockets (a.k.a. BSD sockets) are often used for inter process communication and are the de-facto standard API for I/O (convenient API for user-space I/O). With BSD, splicing TCP sockets requires performing two I/O operations (one read operation and one write operation) per I/O buffer. Additional performance costs include memory copying that consumes several CPU cycles and hurt other processes by "polluting" shared L3 cache and putting additional pressure on the memory channels. The performance costs also include additional system calls and a slow network stack. High-speed Ethernet speeds are reduced by these performance costs of the BSD Sockets because network speeds have outstripped those of the CPU and memory. Thus operations that require extra CPU and memory use become a bottleneck for data transmission. Because the network transmits data faster than a single CPU can feed the data into the network, more than a single CPU core is required to simply saturate a network link.

Attempts have been made to eliminate these performance costs by creating network systems that bypass the kernel of a computer in the network transmission path, such as with DPDK and Netmap. The kernel bypass methods attempt to avoid the performance penalties associated with BSD Sockets. However, by bypassing the kernels, these methods lose the use of network infrastructure that already exists inside the kernel. Without the existing kernel infrastructure, the kernel bypass methods require a substitute for that network. Thus, the developers of such kernel bypass methods also need to re-develop existing network infrastructure of the kernels (e.g., IP, TCP, ICMP, IGMP). Therefore, there is a need in the art for a dedicated memory allocator for I/O operations that inherently facilitates zero-copy I/O operations and exceptionless system calls rather than merely bypassing the kernel.

BRIEF SUMMARY

Modern computers use a bifurcated structure that includes a core operating system (the kernel) and applications that access that kernel operating in a user-space. Some data is used by both the kernel and by applications in the user-space. The prior art copies the data from memory locations used by the kernel to separate memory locations used by applications of the user-space. Unlike that prior art, some embodiments provide a novel method for performing zero-copy operations using a dedicated memory allocator for I/O operations (MAIO). Zero-copy operations are operations that allow separate processes (e.g., a kernel-space process and a user-space process, two sockets in a kernel-space, etc.) to access the same data without copying the data between separate memory locations. The term "kernel-space process," as used herein, encompasses any operation or set of operations by the kernel, including operations that are part of a specific process, operations called by a specific process, or operations independent of any specific process.

To enable the zero-copy operations that share data between user-space processes and kernel-space processes without copying the data, the method of some embodiments provides a user-space process that maps a pool of dedicated kernel memory pages to a virtual memory address space of user-space processes. The method allocates a virtual region of the memory for zero-copy operations. The method allows access to the virtual region by both the user-space process and a kernel-space process. The MAIO system of the present invention greatly outperforms standard copying mechanism and performs at least on par and in many cases better than existing zero-copy techniques while preserving the ubiquitous BSD Sockets API.

In some embodiments, the method only allows a single user to access a particular virtual region. In some embodiments, the allocated virtual region implements a dedicated receiving (RX) ring for a network interface controller (NIC). The dedicated RX ring may be limited to a single tuple (e.g., a single combination of source IP address, source port address, destination IP address, destination port address, and protocol). The dedicated RX ring may alternately be limited to a defined group of tuples.

In the method of some embodiments, the allocated virtual region implements a dedicated transmission (TX) ring for a NIC. Similar to the case in which the virtual region implements an RX ring, the dedicated TX ring may be limited to a single tuple or a defined group of tuples.

The kernel has access to a finite amount of memory. Allocating that memory for use in zero-copy operations prevents the allocated memory from being used for other kernel functions. If too much memory is allocated, the kernel may run out of memory. Accordingly, in addition to allocating virtual memory, the user-space process of some embodiments may also de-allocate memory to free it for other kernel uses. Therefore, the user-space process of some embodiments identifies virtual memory, already allocated to zero-copy operations, to be de-allocated. In some cases, a user-space process may not de-allocate enough memory. Therefore, in some embodiments, when the amount of memory allocated by the user-space process is more than a threshold amount, the kernel-space process de-allocates at least part of the memory allocated by the user-space process. In some embodiments, either in addition to or instead of the kernel-space process de-allocating memory, when the amount of memory allocated by the user-space process is more than a threshold amount, the kernel-space process prevents the user-space process from allocating more memory.

In some embodiments, the kernel-space process is a guest kernel-space process on a guest virtual machine operating on a host machine. The method may additionally allow access to the virtual region by a user-space process of the host machine and/or a kernel-space process of the host.

Zero-copy processes can also be used for TCP splicing. Some embodiments provide a method of splicing TCP sockets on a computing device (e.g., a physical computer or a virtual computer) that processes a kernel of an operating system. The method receives a set of packets at a first TCP socket of the kernel, stores the set of packets at a kernel memory location, and sends the set of packets directly from the kernel memory location out through a second TCP socket of the kernel. In some embodiments, the receiving, storing, and sending are performed without a system call. Some embodiments preserve standard BSD Sockets API but provide seamless zero-copy I/O support.

Packets may sometimes come in to the receiving socket faster than the transmitting socket can send them on, causing a memory buffer to fill. If the memory buffer becomes completely full and packets continue to be received, packets would have to be discarded rather than sent. The capacity of a socket to receive packets without its buffer being overwhelmed is called a "receive window size."

In some embodiments, when the buffer is full beyond a threshold level, the method sends an indicator of a reduced size of the receive window to the original source of the set of packets. In more severe cases, in some embodiments, when the buffer is full, the method sends an indicator to the original source of the set of packets that the receive window size is zero. In general, the buffer will be filled by the receiving socket and emptied (partially or fully) by the transmitting socket. That is, memory in the buffer will become available as the transmitting socket sends data out and releases the buffer memory that held that data. Accordingly, the method of some embodiments sends multiple indicators to the original source of the packets as the buffer fullness fluctuates. For example, when the transmitting socket empties the buffer, the method of some embodiments sends a second indicator that the receive window size is no longer zero.

In some embodiments, the set of packets is a first set of packets and the method waits for the first set of packets to be sent by the second TCP socket before allowing a second set of packets to be received by the first TCP socket. In some such embodiments, the kernel memory location identifies a set of memory pages; the method frees the memory pages with a driver completion handler after the data stored in the memory pages is sent.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Modern computers use a bifurcated structure that includes a core operating system (the kernel) and applications that access that kernel operating in a user-space. Some data is used by both the kernel and by applications in the user-space. The prior art copies the data from memory locations used by the kernel to separate memory locations used by applications of the user-space. Unlike that prior art, some embodiments provide a novel method for performing zero-copy operations using a dedicated memory allocator for I/O operations (MAIO). Zero-copy operations are operations that allow separate processes (e.g., a kernel-space process and a user-space process, two sockets in a kernel-space, etc.) to access the same data without copying the data between separate memory locations. The term "kernel-space process," as used herein, encompasses any operation or set of operations by the kernel, whether these operations are part of a specific process or independent of any specific process.

Figure 1:
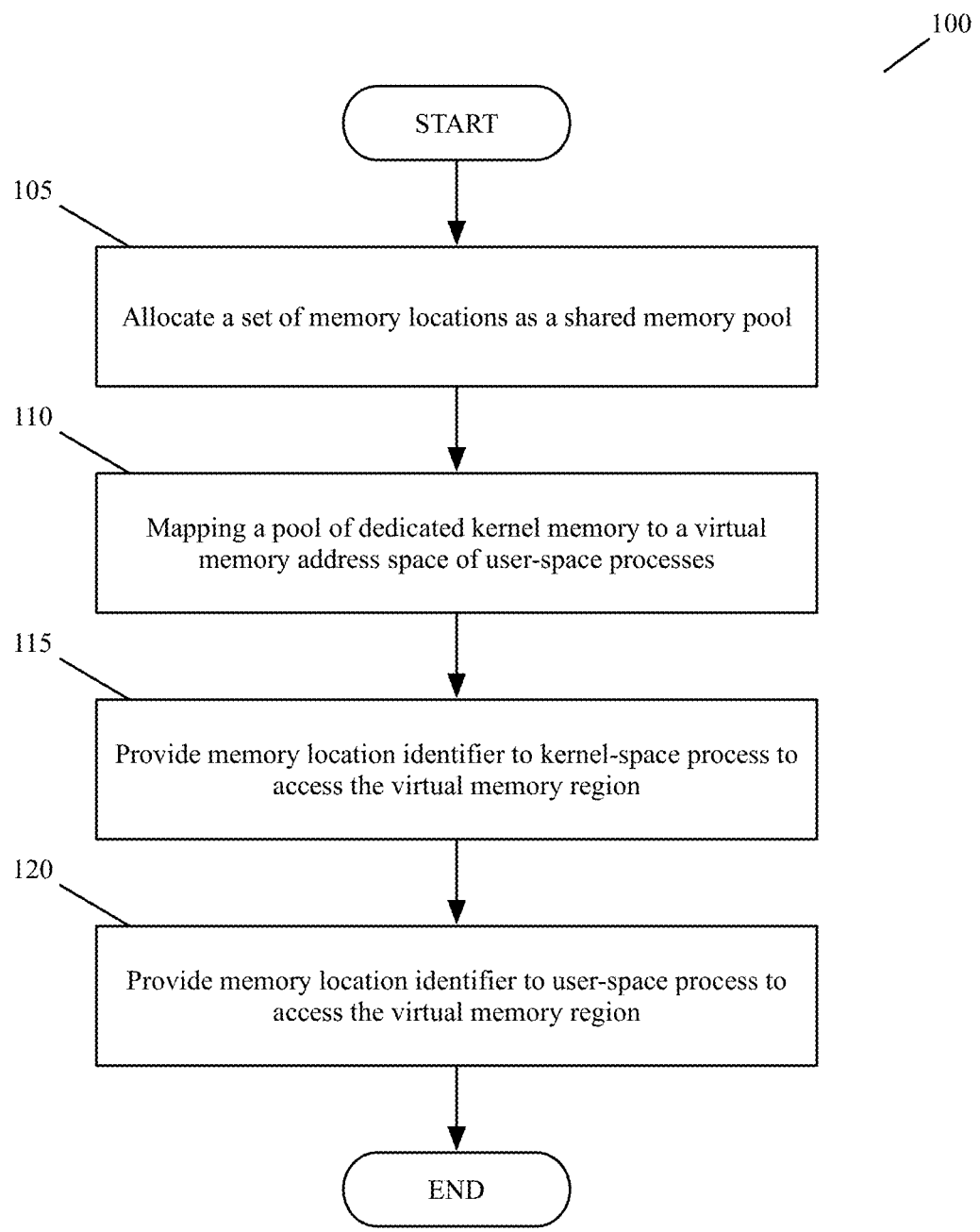
FIG. 1 conceptually illustrates a process that allocates memory as a shared memory pool for user-space and kernel-space processes.
Figure 2:
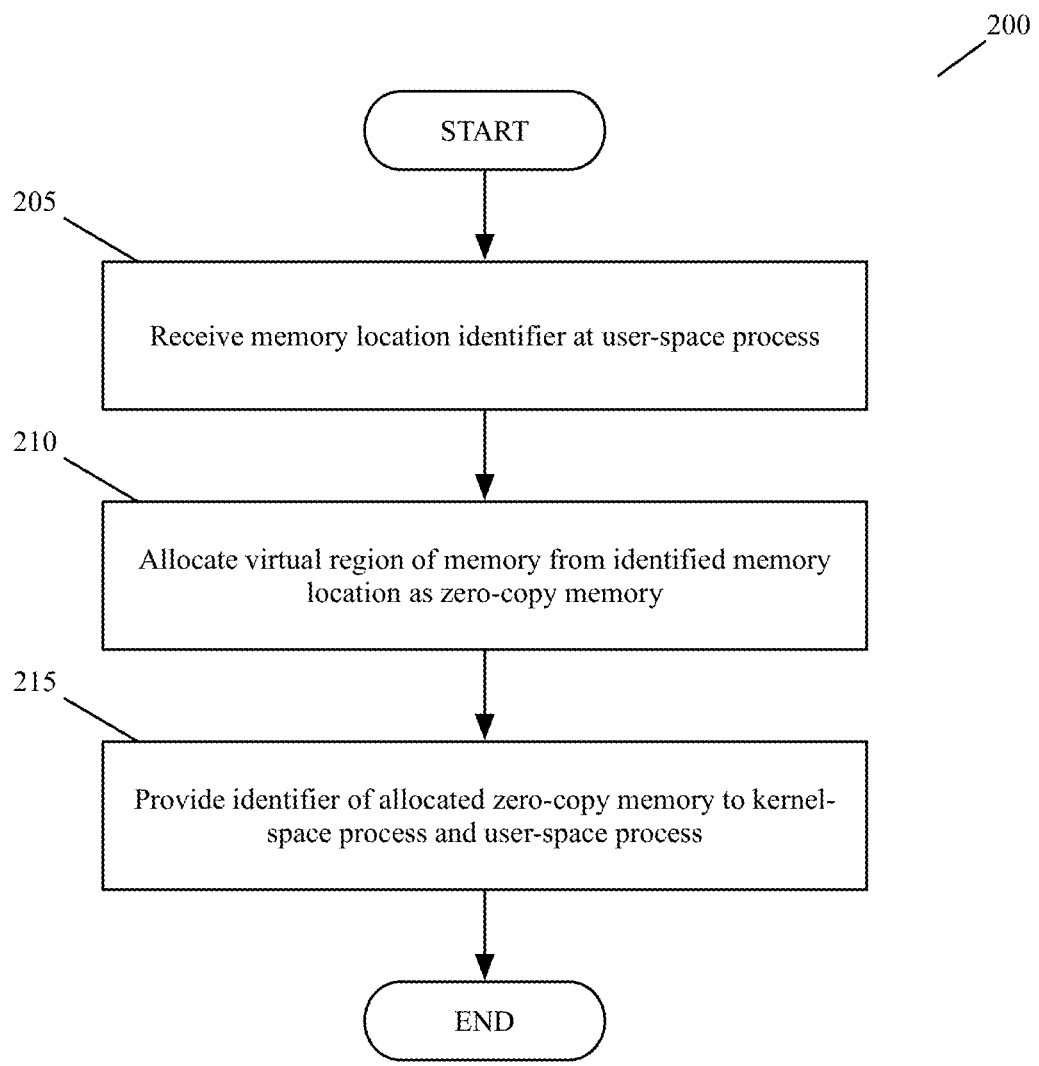
FIG. 2 conceptually illustrates a process for allocating a virtual region of memory for zero-copy operations.
Figure 3:
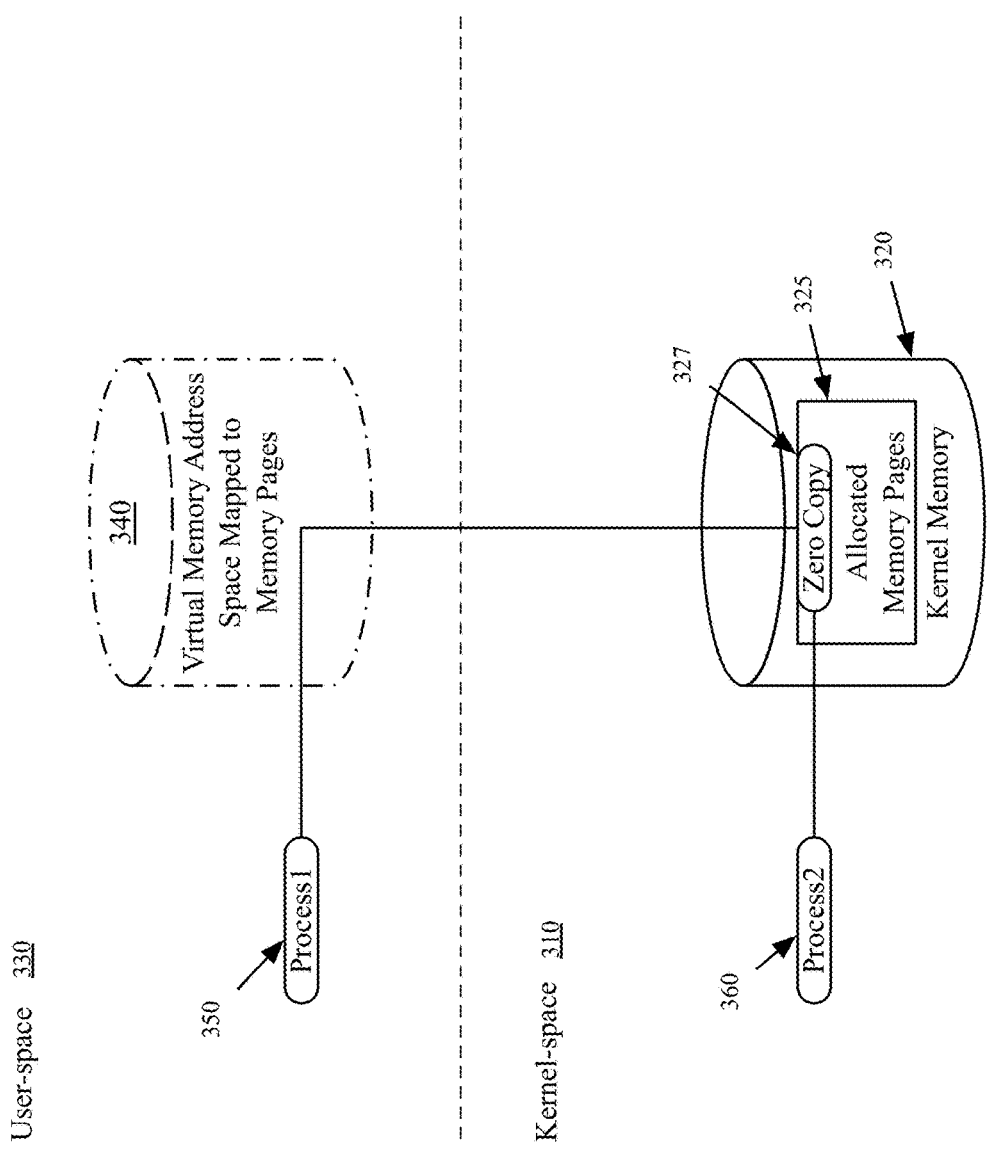
FIG. 3 conceptually illustrates kernel memory allocated as a virtual memory address space in a user-space.

Some embodiments provide a novel method for performing zero-copy operations using dedicated memory allocated for I/O operations. FIG. 1 conceptually illustrates a process 100 that allocates memory as a shared memory pool for user-space and kernel-space processes. FIG. 2 conceptually illustrates a process 200 for allocating a virtual region of memory for zero-copy operations. The process 100 of FIG. 1 and process 200 of FIG. 2 will be described by reference to FIG. 3. FIG. 3 conceptually illustrates kernel memory allocated as a virtual memory address space in a user-space. FIG. 3 includes a kernel-space 310 with kernel memory 320 and user-space 330 with virtual memory 340. Kernel memory 320 includes allocated memory pages 325 which in turn include memory 327 allocated for zero-copy operations. A user-space process 350 runs in user-space 330 and a kernel-space process 360 runs in kernel-space 310.

The process 100 of FIG. 1 prepares memory for sharing data between user-space processes and kernel-space processes without copying the data. The method 100 allocates (at 105) a set of memory locations as a shared memory pool. In some embodiments, the memory pool is allocated from kernel memory. An example of this is shown in FIG. 3, with memory pages 325 allocated as shared memory pages. The process 100 (of FIG. 1) then maps (at 110) a pool of the dedicated kernel memory to a virtual memory address space of user-space processes. FIG. 3 illustrates such a mapping with the allocated memory pages 325 mapped to virtual memory 320. Although the embodiment of FIG. 3 shows the allocated memory pages 325 mapped to a single virtual memory space, in some embodiments the allocated memory may be mapped to multiple virtual memory address spaces (e.g., for multiple processes in a single user-space, processes in multiple user-spaces, processes owned by multiple tenants of a datacenter, etc.)

After the memory is mapped, the process 100 then provides (at 115) the memory location identifier to a kernel-space process to allow the kernel-space process to access the virtual memory region. The process 100 also provides (at 120) a memory location identifier to a user-space process to access the virtual-memory region.

Although the process 100 is shown as providing memory location identifier to the kernel-space process first, one of ordinary skill in the art will understand that other embodiments provide the memory location identifier to the kernel-space process after providing it to the user-space process. Additionally, in some embodiments, the features of either operation 115 or operation 120 may be combined with the features of operation 110 into a single operation in which the mapping operation is performed by a kernel-space operation or a user-space operation which creates the memory location identifier of operations 115 or 120 in the course of a mapping operation similar to operation 110. In some embodiments, the location identifier may supply an identifier of a memory location in kernel-space at which the memory begins and/or a corresponding memory location in a virtual memory for the user-space at which the memory begins. In embodiments in which the kernel-space and the user-space each uses a separate addressing locations for the same physical memory location, this or whatever other location identifier or identifiers are exchanged between the user-space process and the kernel allows the kernel to identify an address of a page, in the kernel-space memory, based on a supplied memory page address, in the virtual memory, provided to the kernel by the user-space process. Similarly, in some embodiments, the user-space process may translate the address locations between the virtual memory addresses and the kernel-space memory addresses.

Once the process 100 maps a pool of dedicated kernel memory pages to a virtual memory address space of user-space processes, some embodiments provide a process for allocating a virtual region of that dedicated kernel memory for zero-copy operations. FIG. 2 conceptually illustrates a process 200 for allocating a virtual region of memory for zero-copy operations. The process 200 receives (at 205) a memory location identifier of an allocated pool of memory shared by kernel-processes and user-space processes. In some embodiments, the memory location identifier is received from a user-space process or kernel-space process that allocates the memory (e.g., in operation 110 of FIG. 1).

The process 200 allocates (at 210) a virtual region of memory from the identified memory location for use in a zero-copy memory operation. The process 200 provides (at 215) an identifier of the allocated memory for zero-copy memory operations to a kernel-space process and a user-space process. In FIG. 3, the zero-copy memory is accessible by both user-space process 350 and kernel-space process 360. Although process 200 is described as being performed by a user-space process, one of ordinary skill in the art will understand that in some embodiments a kernel-space process allocates the memory for zero-copy memory operations instead of the user-space process allocating the memory. Similarly, in some embodiments, both user-space processes and kernel-space processes can allocate memory for zero-copy memory operations.

Zero-copy operations between kernel-space and user-space are useful in multiple processes. One such process is receiving and transmitting data in I/O operations. In existing systems, the direct and indirect costs of system calls impact user-space I/O performance. Some embodiments of the present invention avoid these costs by offloading the I/O operation to one or more dedicated kernel threads which will perform the I/O operation using kernel sockets rather than requiring user-space processes to perform the I/O operations. In some embodiments, a dedicated ring memory buffer (sometimes called an RX ring) is used for receiving data at a network interface controller (NIC) and a second dedicated ring memory buffer is used for transmitting data from the NIC. The dedicated RX ring may be limited to a single tuple (e.g., a single combination of source IP address, source port address, destination IP address, destination port address, and protocol). The dedicated RX ring may alternately be limited to a defined group of tuples. Similarly, in some embodiments an allocated virtual region implements a dedicated transmission ring memory buffer (sometimes called a TX ring) for a NIC. As in the case in which the virtual region implements an RX ring, the dedicated TX ring may be limited to a single tuple or a defined group of tuples.

Figure 4:
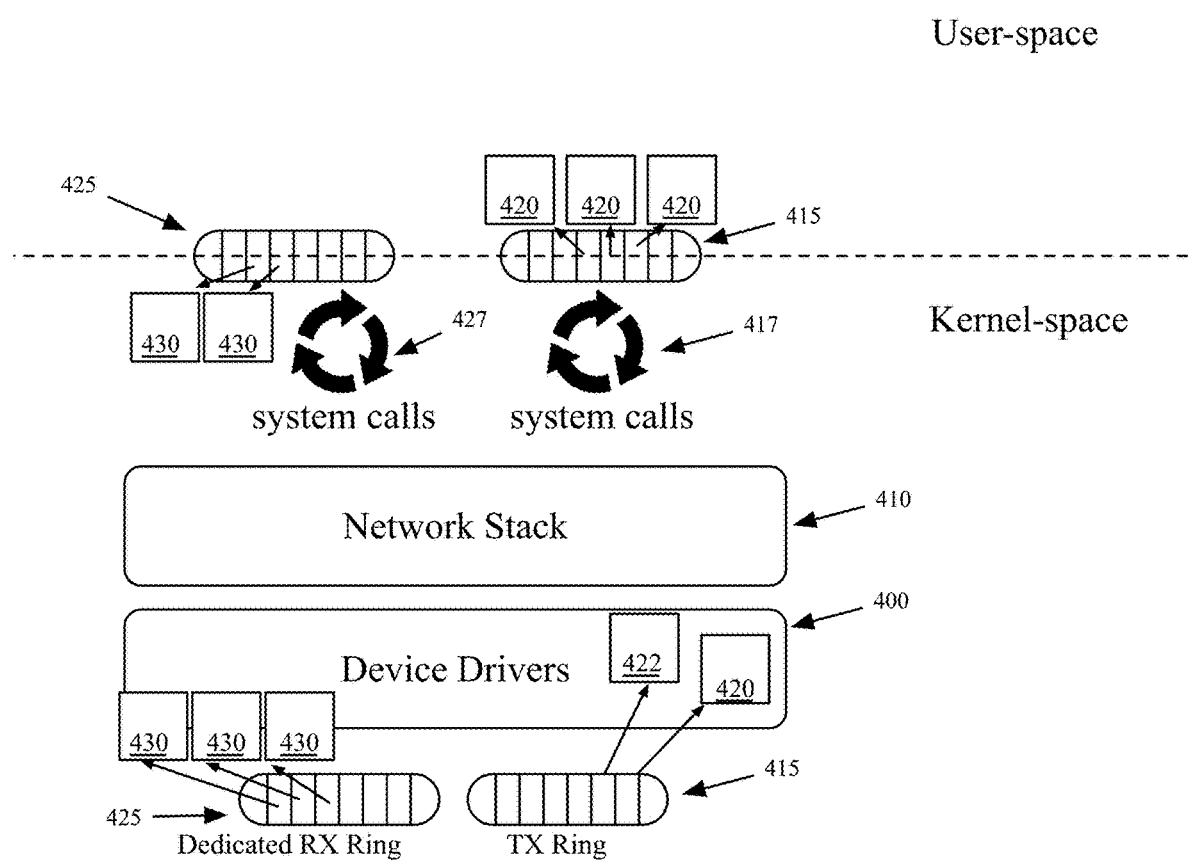
FIG. 4 conceptually illustrates system calls using dedicated ring buffers.

An example of such dedicated RX and TX rings is shown in FIG. 4. FIG. 4 conceptually illustrates send and receive threads using dedicated ring buffers. FIG. 4 includes device drivers 400 and a network stack 410 operating in kernel-space, dedicated transmission ring memory buffers 415 which receive data 420 from kernel system calls (i.e., system calls sending messages from the kernel to the user-space), dedicated receiving ring memory buffers 425 which transmit data 430, through kernel system calls (i.e., system calls receiving messages at the kernel from the user-space).

Although the dedicated transmission memory buffer ring 415 is shown as two separate items, one in the kernel-space and one straddling a dashed line separating user-space from kernel-space, they are the same memory buffer ring shown from two different perspectives, not two separate entities. Kernel processes and user processes each have access to the transmission memory buffer ring 415 and the data 420 sent from the kernel with system calls 417 in the user-space is all data stored in the transmission memory buffer ring 415. In addition to storing data 420 for MAIO pages, in some embodiments, the dedicated transmission ring may be used to store data 422 for a kernel buffer without needing any special care for data separation.

As with dedicated memory buffer ring 415, although the dedicated receiving memory buffer ring 425 is shown as two separate items, one in the kernel-space and one straddling a dashed line separating user-space from kernel-space, they are also a single memory buffer ring shown from two different perspectives, not two separate entities. Kernel processes and user processes each have access to the transmission memory buffer ring 425 and the data 430 received by the kernel with system calls 427 from the user-space is all data stored in the transmission memory buffer ring 425.

Some embodiments use dedicated threads with the ring buffers. This has multiple advantages. For example, it reduces the need for some system calls which would otherwise slow down the data transmission. For example, when sending data some embodiments do not require a send_msg system call, but instead use an I/O descriptor (e.g., struct, msghdr, and int flags) written to a shared memory ring buffer. Additionally, splitting (between the kernel-space process and the user-space process) responsibility for performing I/O preserves the existing socket API, facilitates exceptionless system calls, and allows for better parallel programming. Furthermore, bifurcated I/O (splitting the responsibility for performing the I/O) enables the separation of the application computations and the TCP computations to different CPU cores. In some embodiments, dedicated kernel threads are also used to perform memory operations (e.g., retrieving memory buffers back from the user).

Although the embodiment of FIG. 4 shows receiving and transmitting only through zero-copy operations, in other embodiments, both zero-copy and standard send and receive operations are supported. For example, some embodiments provide support for standard I/O operations for apps with small I/O needs (e.g., where the copying of only a small amount of data reduces or eliminates the savings from zero-copy operations). In standard mode, the sent buffer is copied to a new MAIO buffer before being sent. In some embodiments the common memory is allocated using a NIC driver. In some embodiments, the NIC driver dedicates the memory using an application device queue (ADQ). Various embodiments may map the kernel-space memory to the virtual (user-space) memory after the NIC driver dedicates the memory for user space, after the NIC driver dedicates the memory to kernel-space, or in some embodiments the NIC driver may perform the mapping of the kernel-space memory to the virtual memory as well as dedicating the memory to a user-space process using an ADQ.

Figure 5:
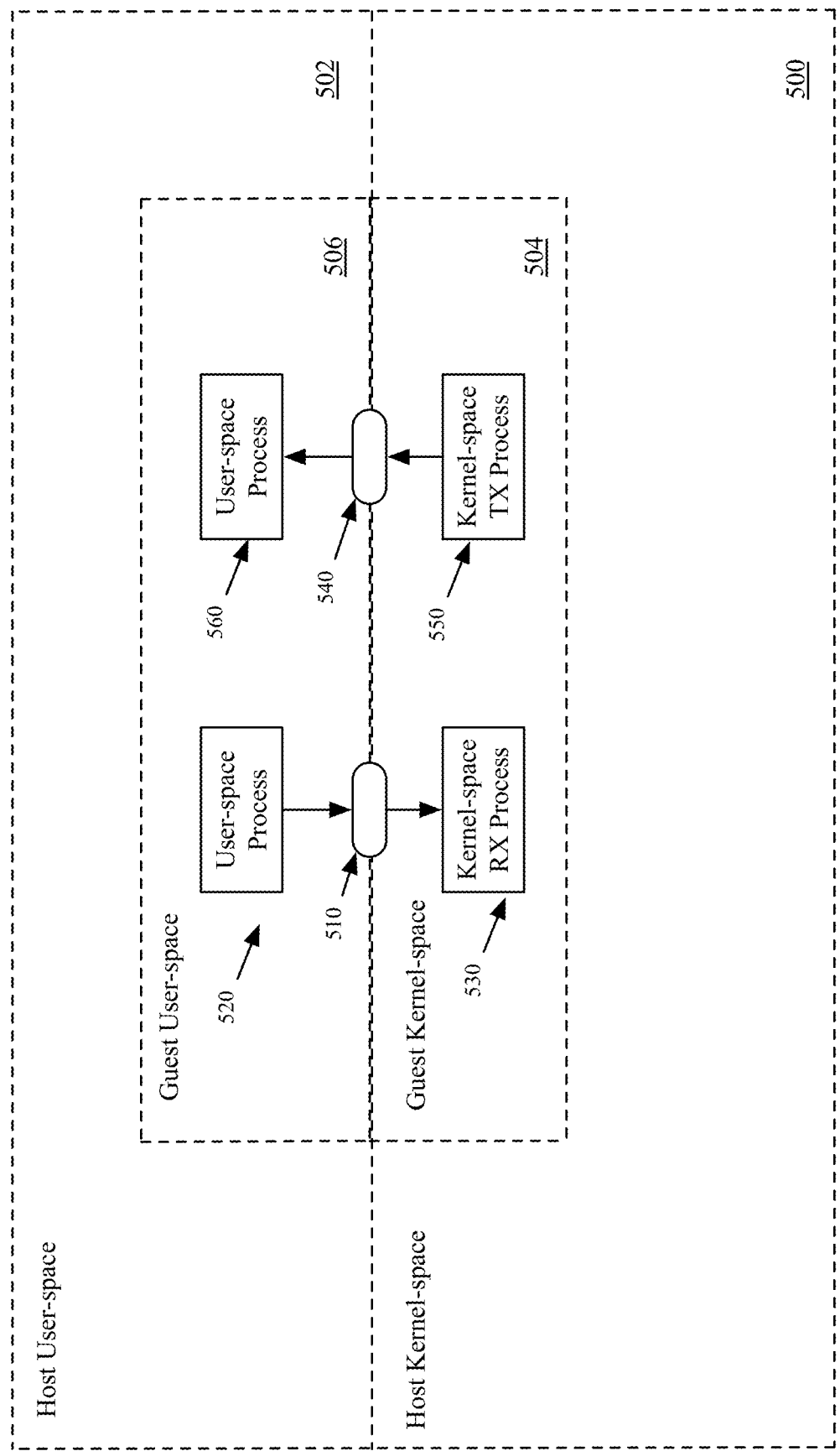
FIG. 5 illustrates a zero-copy memory accessible by the user-spaces and kernel-spaces of both a guest machine and a host machine.

The previous figure illustrated the use of the present invention in a computer system with a single user-space and a single kernel-space. However, the invention is not limited to such systems. In some embodiments, the invention operates on a guest machine (e.g., a virtual machine operating on a physical host machine). In some such embodiments, both the host system and the guest system are designed to use zero-copy operations and are both able to access the shared memory. FIG. 5 illustrates a zero-copy memory accessible by the user-spaces and kernel-spaces of both a guest machine and a host machine. FIG. 5 includes a host kernel-space 500, a host user-space 502, a guest kernel-space 504, and a guest user-space 506. A kernel-space process 530 operates in the guest-kernel-space 504 and receives data from a user-space process 520 through a dedicated memory ring buffer 510. Similarly, another kernel-space process 550 operates in the guest-kernel-space 504 and receives data from a user-space process 560 through a dedicated memory ring buffer 540.

The embodiments of FIG. 5 includes only a single guest machine, eliminating security issues that might arise from exposing data from one guest machine, that is owned by a first tenant, to a second data machine that is owned by a second tenant. However, even when multiple tenants have guest machines on the same host machine, the present invention still provides security for the tenants' data.

Figure 6:
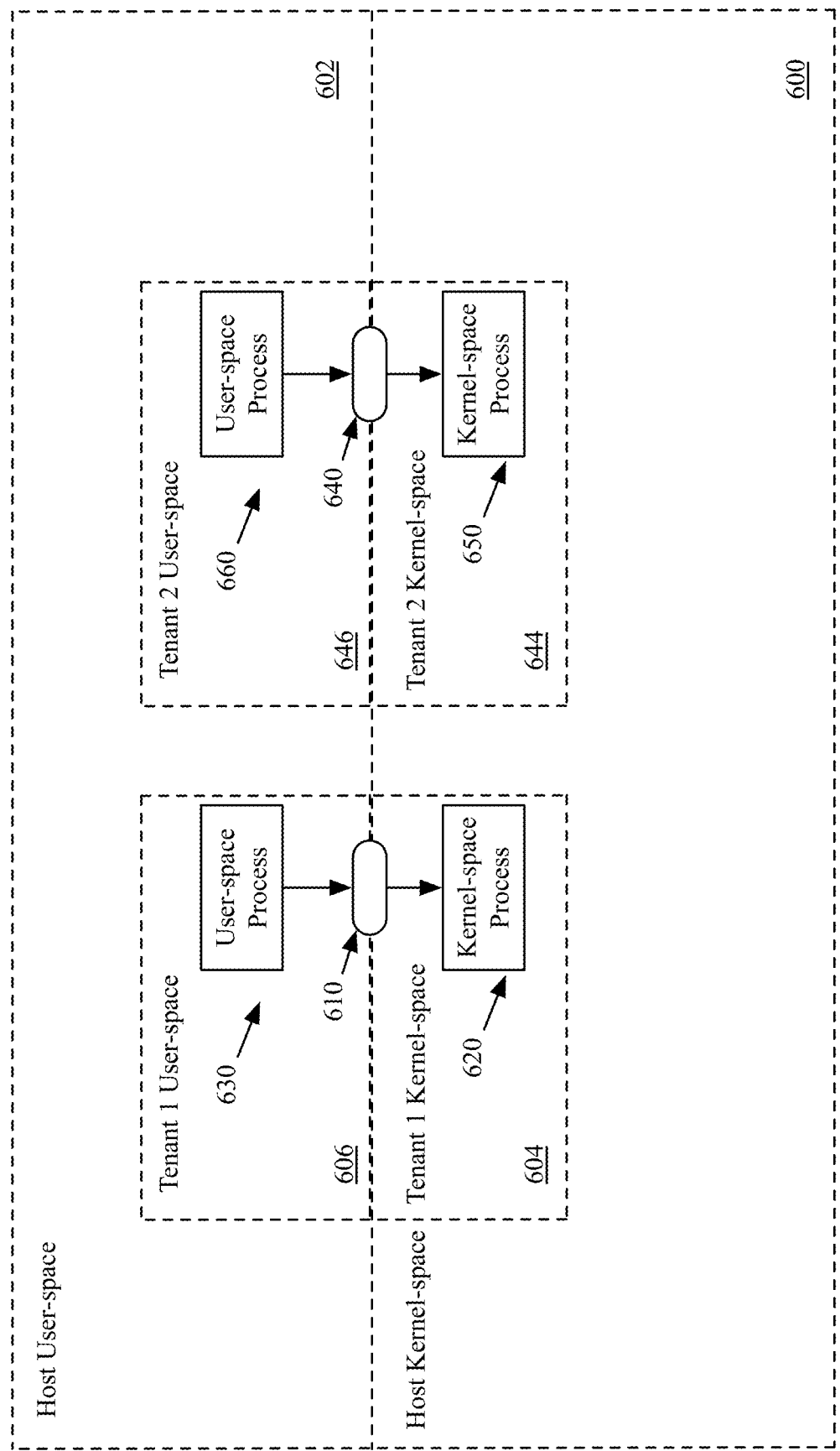
FIG. 6 illustrates a dedicated memory allocation I/O system operating on a multi-tenant host.

In order to protect data when user-processes now seemingly have access to sensitive kernel memory, the present invention provides entirely separate allocated memory to different tenants. That is, in some embodiments, the method limits access to the virtual region allocated for zero-copy operations to a single user. Thus, the kernel memory a particular user has access to contains only data that the particular user would normally have access to. FIG. 6 illustrates a dedicated memory allocation I/O system operating on a multi-tenant host. FIG. 6 includes a host kernel-space 600 and a host user-space 602. Tenant 1 has a guest machine with a guest kernel-space 604, and a guest user-space 606. A kernel-space process 620 operates in the guest-kernel-space 604 and receives data from a user-space process 630 through a dedicated memory ring buffer 610. Tenant 2 has a guest machine with a guest kernel-space 644, and a guest user-space 646. A kernel-space process 650 operates in the guest-kernel-space 644 and receives data from a user-space process 660 through a dedicated memory ring buffer 640. Memory ring 610 is used exclusively for tenant 1, while memory ring 640 is used exclusively for tenant 2. Accordingly, no data can leak from tenant 1 to tenant 2 or vice versa through the dedicated memory ring buffers.

Some embodiments provide additional security features. For example, in some embodiments, shared pages are only ever used by the kernel to hold I/O data buffers and not any metadata or any other data needed by the kernel. That is, the user-space process can only ever see the information that a user-space process has written or data bound to user-space which would be received by the user in a standard operation, even if a zero-copy operation were not used. In some embodiments, in addition to the message data, the kernel-process is privy to transport headers as well. In some embodiments, where the NIC supports Header/Data splitting, the kernel-process places the headers onto non-shared buffers for additional security. In contrast, in embodiments where all potential receiving memory ring buffers are shared, the MAIO would potentially expose all traffic to a single observer. In the absence of driver support for keeping different tenant data separate, the usefulness of MAIO in such embodiments should be limited to those cases when any user with access is trusted (e.g., sudo).

Kernel memory allocated to zero-copy operations is not available for other kernel functions. If allocated memory is not released back to the kernel while new memory continues to be allocated, the kernel may run out of memory for those other functions. Therefore, in addition to allocating virtual memory, the user-space process of some embodiments may de-allocate memory. That is, the user-space process may identify virtual memory, previously allocated to zero-copy operations, to be de-allocated.

Figure 7:
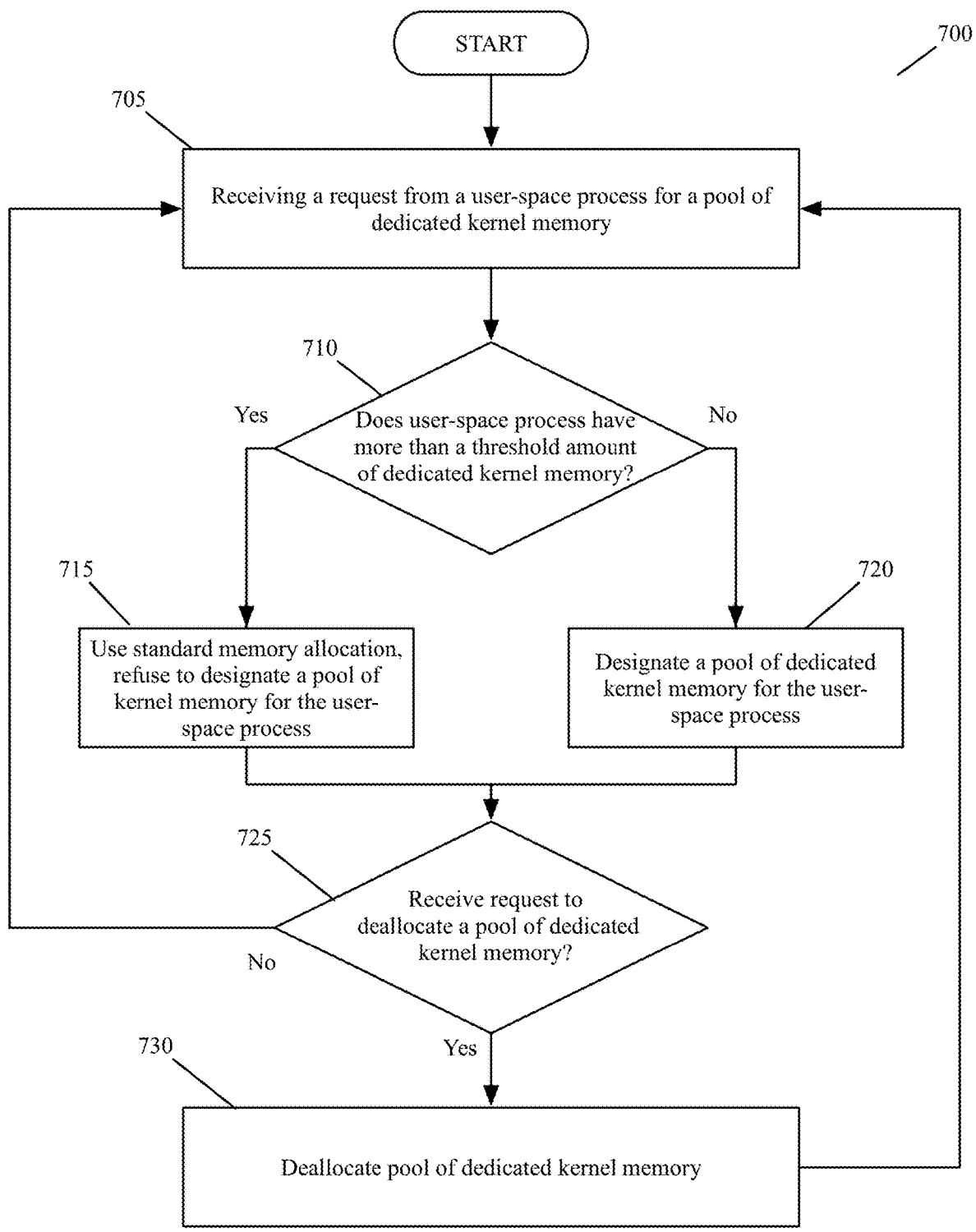
FIG. 7 conceptually illustrates a process 700 of some embodiments for allocating and de-allocating kernel memory for shared memory access with kernel-space and user-space processes.

Under some circumstances, a user-process may not properly de-allocate memory. Accordingly, in some embodiments, when the amount of memory allocated by the user-space process is more than a threshold amount, the kernel-space process takes corrective action. In some embodiments, when the amount of memory allocated by the user-space process is more than a threshold amount, the kernel-space process prevents the user-space process from allocating more memory. FIG. 7 conceptually illustrates a process 700 of some embodiments for allocating and de-allocating kernel memory for shared memory access with kernel-space and user-space processes. The process 700 receives (at 705) a request from a user-space process for a pool of dedicated kernel memory to be accessed by both kernel-space and user-space processes. The process 700 determines (at 710) whether the user-space process has more than a threshold amount of kernel memory dedicated to that user-space process. In some embodiments, the threshold is a fixed amount, in other embodiments; the threshold is variable based on available (free) system resources, relative priority of various user-processes etc. In some embodiments, the threshold is determined on a per-process basis; in other embodiments, the threshold may be determined on a per guest machine basis or a per-tenant basis.

When the process 700 determines (at 710) that the user-process has more than the threshold amount of memory, the process 700 uses (at 715) a standard memory allocation (e.g., the driver of the NIC uses a standard memory allocation) and refuses to designate a pool of kernel memory for the user-space process. For example, this occurs when a user-space process hoards MAIO buffers without releasing them to the kernel, thus starving the kernel of needed memory. In some embodiments, when the driver of the NIC reverts to standard memory allocation, this renders the user-space process unable to receive, while other process and kernel functionality will remain intact. After operation 715, the process 700 moves on to operation 725.

When the process 700 determines (at 710) that the user-process does not have more than the threshold amount of memory, the process 700 designates (at 720) a pool of dedicated kernel memory for the user-space process to share with kernel-space processes. After operation 720, the process 700 moves on to operation 725.

The process 700 determines (at 725) whether it has received (e.g., from the user-space process) a request to de-allocate a pool of dedicated kernel memory. When the process 700 has received a request to de-allocate a pool of dedicated kernel memory, the process 700 de-allocates (at 730) that pool of kernel memory, freeing that pool to be allocated for shared use with other user-space processes or for use in other kernel operations. The process then returns to operation 705 when it receives a new request for a pool of memory. When the process 700 determines (at 725) that it has not received a request to de-allocate a pool of dedicated kernel memory, the process 700 returns to operation 705.

The process 700 may be used to prevent memory hoarding by a user process in circumstances when zero-copy solutions with a shared static buffer are considered dangerous because these shared pages can be exhausted and cannot be swapped out. However, some modern systems have hundreds of GB of RAM and such systems may not be exhausted during typical operation. In such systems, the user-space process might not reach a threshold level requiring the kernel to refuse further memory allocation. In other embodiments, the kernel-space process itself de-allocates memory allocated to the user-space process rather than merely denying new allocations.

Although the previous description involved zero-copy operations used between kernel-space processes and user-space processes, zero-copy processes can also be used in kernel-space to kernel-space operations. One example, of such kernel/kernel operations is TCP splicing. TCP splicing is a method of splicing two socket connections inside a kernel, so that the data relayed between the two connections can be run at near router speeds.

In older prior art, TCP splicing involved user-space processes as well as kernel-space processes. In more recent prior art, a process called an "eBPF callback" is called when a packet is received. The eBPF callback forwards the received packet to a predefined socket. However, the prior art eBPF callback is problematic due to the fact that the callback is invoked in a non-process context. That is, the eBPF callback process has no way to determine whether the predefined socket to which the callback is forwarding the packet is ready to handle a packet. Therefore, when the destination socket cannot send (e.g., due to a closed send or receive window); there is no feedback process that can tell the original sender to wait for the window to open. Without this option, the notion of "back-pressure" (narrowing a receive window to tell the system that is the original source of the packets to slow or stop transmission until the transmitting socket can send the packets that already arrived) is infeasible. Back-pressure is paramount for socket splicing where the two connected lines are of different widths.

In contrast to the prior art eBPF callback, the present invention allows backpressure in the form of feedback to the original source when the transmitting socket is not ready to receive more packets. Some embodiments provide a method of splicing TCP sockets on a computing device (e.g., a physical computer or a virtual computer) that processes a kernel of an operating system. The method receives a set of packets at a first TCP socket of the kernel, stores the set of packets at a kernel memory location, and sends the set of packets directly from the kernel memory location out through a second TCP socket of the kernel. The method provides back-pressure that prevents the original source of the packets from sending packets to the receiving socket faster than the transmitting socket of the splice can send them onward. In some embodiments, the receiving, storing, and sending are performed without a system call.

Figure 8:
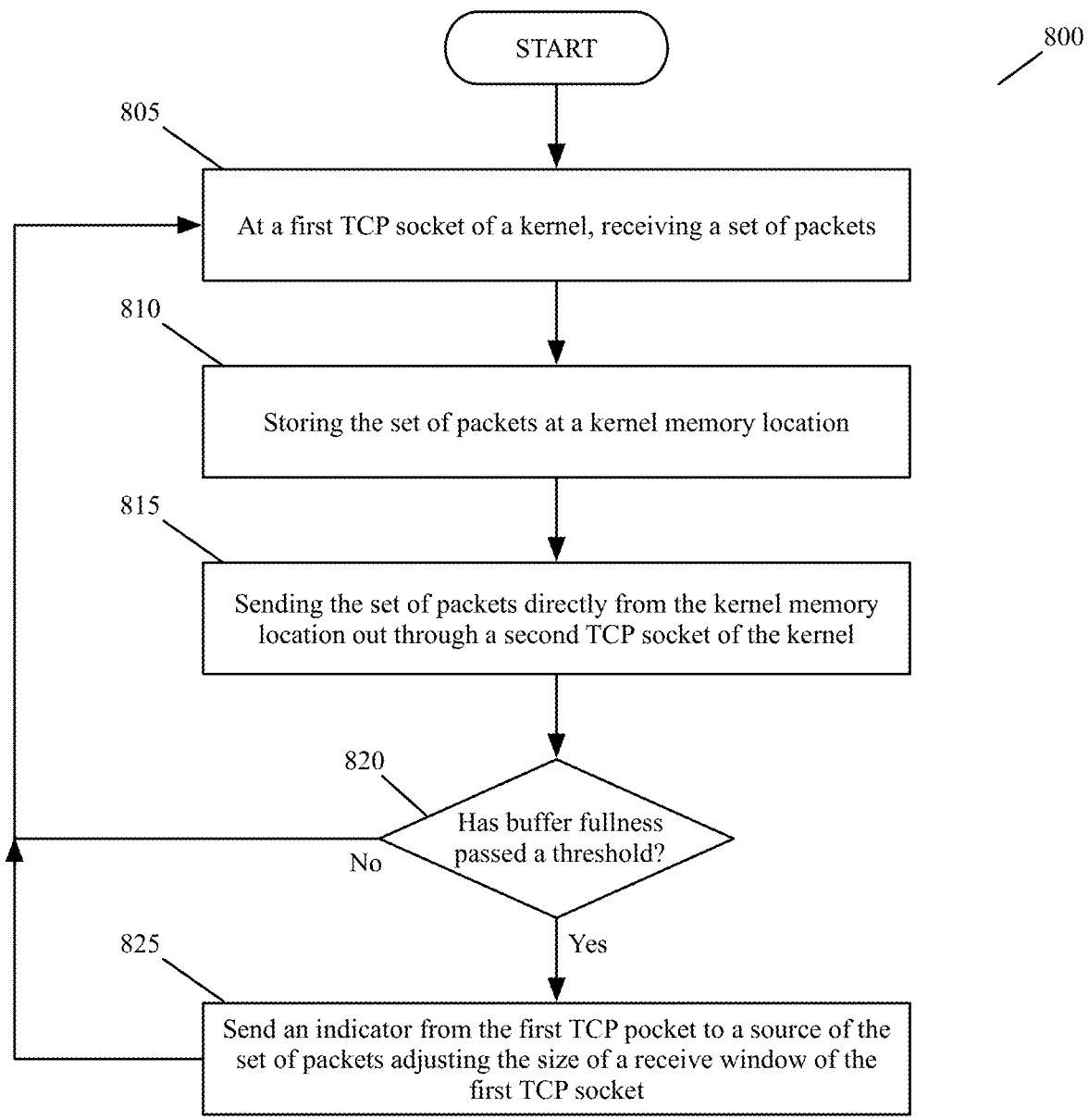
FIG. 8 conceptually illustrates a process 800 for zero-copy TCP splicing.
Figure 9:
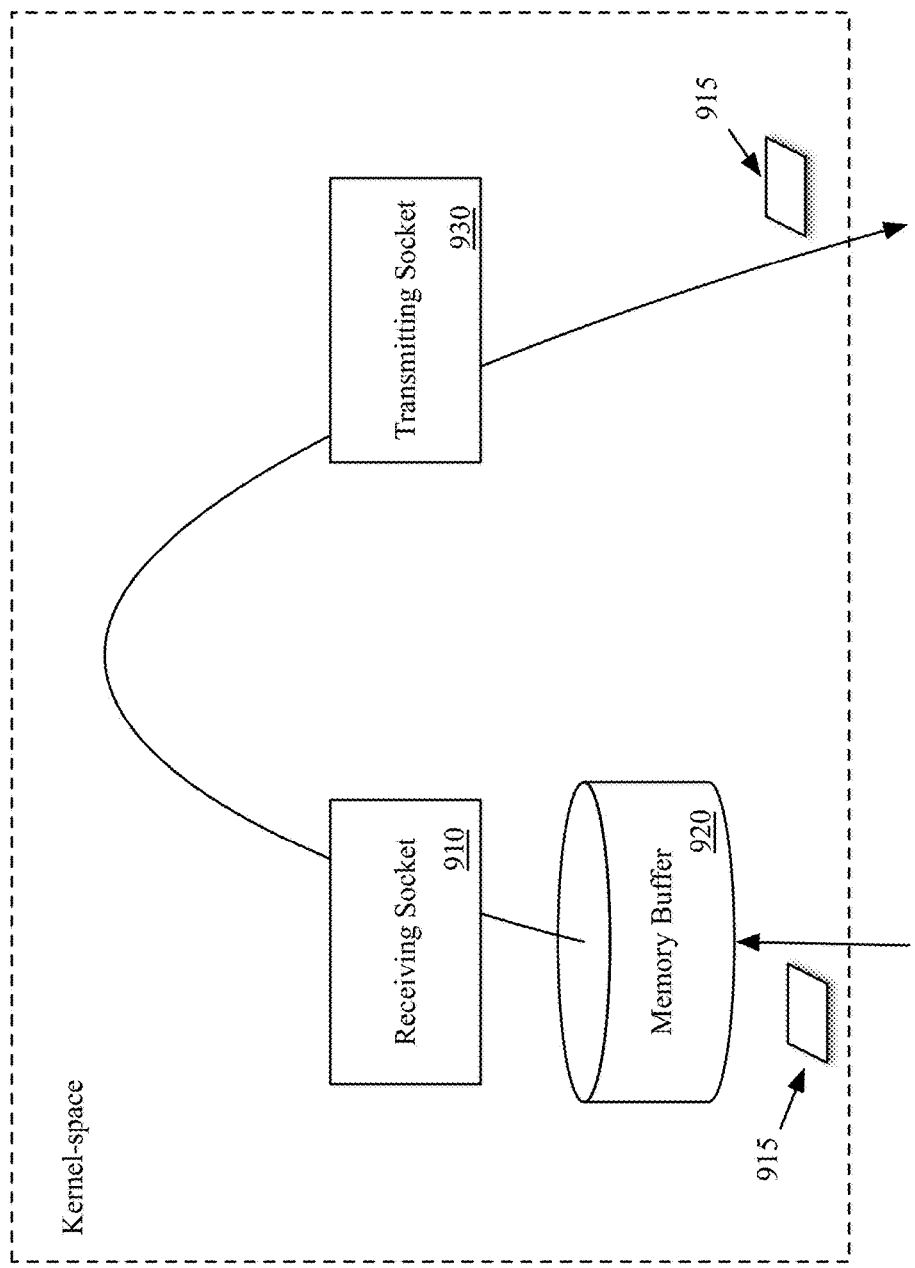
FIG. 9 conceptually illustrates zero-copy TCP splicing between two kernel sockets.

FIG. 8 conceptually illustrates a process 800 for zero-copy TCP splicing. The process 800 will be described by reference to FIG. 9 which conceptually illustrates zero-copy TCP splicing between two kernel sockets. FIG. 9 includes receiving socket 910 which receives data packets 915 and stores them in memory buffer 920 and transmitting socket 930 which transmits the data packets from the memory buffer 920 without any intermediate copying of the data.

The process 800 of FIG. 8 receives (at 805), at a first TCP socket (e.g., such as receiving socket 910 of FIG. 9) of a kernel, a set of data packets (e.g., such as data packets 915 of FIG. 9). The process 800 of FIG. 8 stores (at 810) the data packets in a kernel memory location. For example, memory buffer 920 of FIG. 9. The process 800 of FIG. 8 sends (at 815) the set of packets directly from the kernel memory location out through a second TCP socket of the kernel. For example, transmitting socket 930 of FIG. 9. In some embodiments, the kernel memory location identifies a set of memory pages of a particular set of data, and the method frees the memory pages with a driver completion handler after the data stored in the memory pages is sent (at 815).

In some cases, the transmitting socket 930 may not be able to transmit packets as quickly as the receiving socket 910 is able to receive them. When that occurs, the receiving socket 910 adds packets to the memory buffer 920 faster than the transmitting socket 930 can clear the packets by sending them. Thus, the memory buffer 920 fills up. Accordingly, the process 800 determines (at 820) whether the buffer fullness has crossed a threshold level. This can happen in one of two ways, by the fullness increasing past a first threshold or decreasing past a second threshold. One of ordinary skill in the art will understand that in some embodiments the first and second thresholds will be the same and in other embodiments the thresholds will be different.

When the buffer becomes full beyond a first threshold level, the process 800 sends (at 825) an indicator from the first TCP socket (e.g., receiving socket 910 of FIG. 9) to a source of the set of packets (not shown). The indicator communicates that the size of a receive window of the first TCP socket has been adjusted downward. After the window size is reduced the process 800 returns to operation 805 and loops through operations 805-820 until the buffer fullness passes another threshold at 820. When the original source of the packets receives such an indicator, it slows down transmission of new packets to the receiving socket 910. If this adjustment reduces the rate of receiving incoming packets below the rate that the transmitting socket, then the buffer will gradually empty while the process 800 loops through operations 805-820.

The reduction of the rate of incoming packets will eventually result in the buffer dropping below a threshold (on subsequent passes through the loop). At that point, the process 800 then sends (at 825) an indicator increasing the size of the receiving window. Once the indicator is sent, the process 800 returns to operation 805 and continues to loop through operations 805-820, occasionally returning to operation 825 to adjust the size of the receive window up or down as needed before returning to the loop again.

While the adjustments are intended to keep the packets arriving at a rate that always leaves adequate space in the buffer, in some cases, the buffer may become nearly or entirely full. In such cases, the process 800 sends (at 825) an indicator to the original source of the set of packets, that the receive window size is zero, stopping the transmission of packets to the receiving socket entirely until the transmitting socket clears enough space in the buffer. Subsequent passes through the loop send (at 815) packets, but do not receive or store new ones until the buffer has enough space to resume receiving and the process 800 sends (at 825) an indicator that the receive window is open again.

Although the above described figures disclose the elements of some embodiments, some embodiments may include other elements. For example, in some embodiments, the memory allocator uses a pool of dedicated compound memory pages (i.e., _GFP_COMP). In some embodiments, the allocator is partly based on two mechanisms: a page frag mechanism over 64 KB buffers and these buffers in turn are allotted by a magazine allocator. This allocation scheme efficiently allocates variable size buffers in the kernel. Variable size allocation is useful to support variable sizes of MTU & HW offloads (e.g., HW GRO). To facilitate zero-copy, these pages are mapped once to the virtual memory address space of the privileged user-space process. The user-space process accesses MAIO buffers in two ways in some embodiments: (1) Zero-copy send, in which the user-space process has to mmap (mmap is a Unix system call that maps files or devices into memory), or perform a similar operation appropriate to the operating system on which the invention is implemented, the MAIO buffer and then allocate a virtual region for its own use (the allocated region's size is a multiple of 64 KB in some embodiments); and (2) Zero-copy receive, in which the user-space process performs a zero-copy receive operation to get MAIO buffers. The user-space process of some embodiments can return memory to the kernel via an exception-less mechanism.

With respect to Zero-copy support for kernel sockets, some embodiments expand the existing Linux TCP API with a tcp_read_sock_zcopy for RX and add a new msg flag, SOCK_KERN_ZEROCOPY, for tcp_sendmsg_locked in TX. With respect to receiving, some embodiments provide a new function, tcp_read_sock_zcopy, based on existing infrastructure i.e., tcp_read_sock. It is used by tcp_splice_read to collect buffers from a socket without copying. When kernel memory is used for I/O (e.g., for TCP socket splicing), enabling zero-copy is less complicated when compared to zero-copy from user-space. The pages are already pinned in memory and there is no need for a notification on TX completion. The pages are reference counted, and can be freed by the device driver completion handler (do_tcp_send-pages). Instead of modifying the behavior of tcp_sendms-g_locked, it is also possible to use do_tcp_sendpages, which is used in splicing. Ironically, do_tcp_sendpages accepts only one page fragment (i.e., struct page, size and offset) per invocation and does not work with a scatter-gather list, which tcp_sendmsg_locked supports. Although the above description refers to TCP, one of ordinary skill in the art will understand that the inventions described herein also apply to other standards such as UDP, etc.

Figure 10:
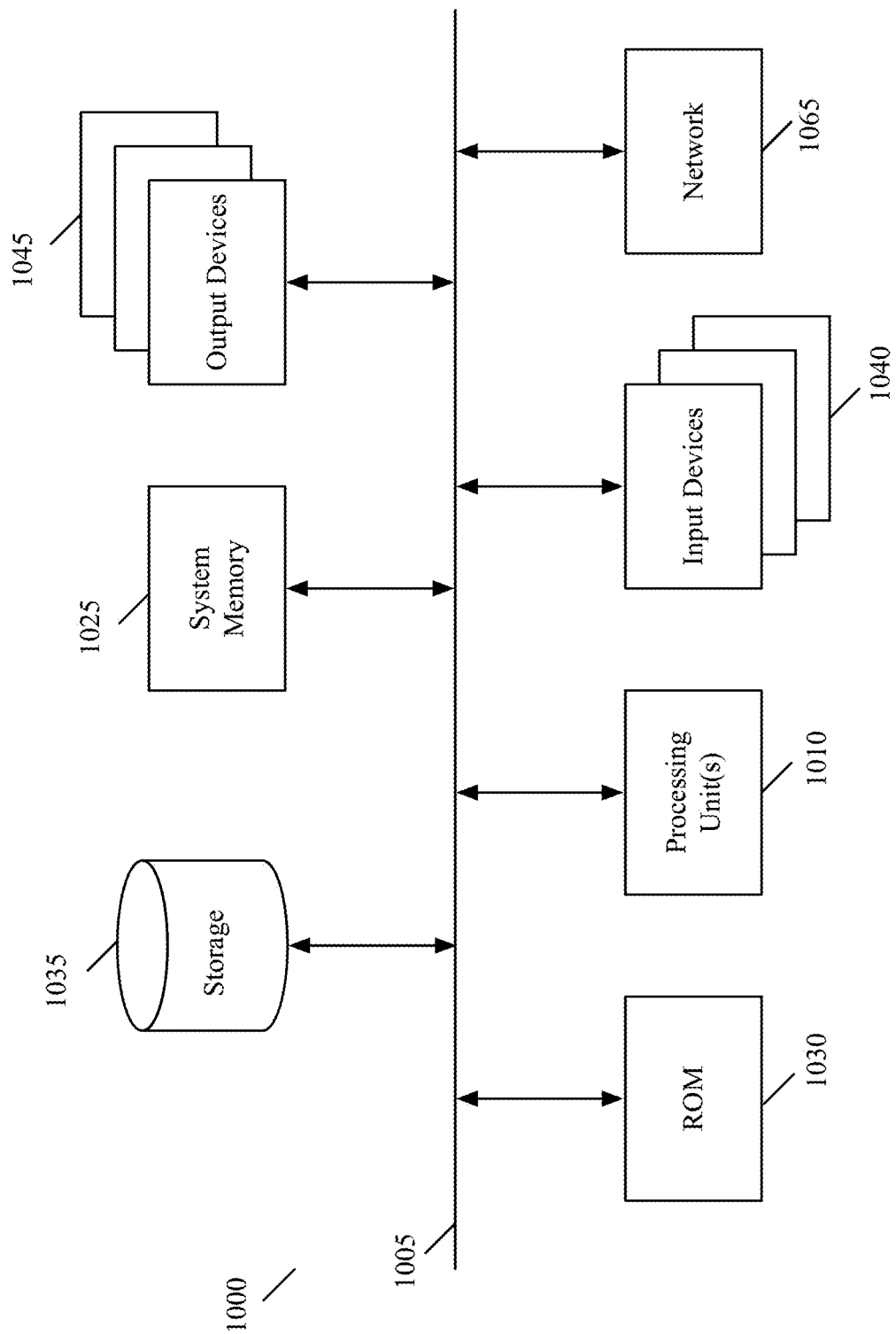
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alpha-numeric keyboards and pointing devices (also called "cursor control devices"). The output devices 1045 display images generated by the electronic system 1000. The output devices 1045 include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of splicing Transmission Control Protocol (TCP) sockets on a computing device that processes a kernel of an operating system, the method comprising:
   receiving a set of packets at a first TCP socket of the kernel;
   storing the set of packets at a kernel memory location;
   sending the set of packets directly from the kernel memory location out through a second TCP socket of the kernel, the kernel memory location comprising a location of a buffer of a particular size;
   sending an indicator of a receive window size of the first TCP socket to a source of the set of packets;
   when the buffer is full beyond a threshold level, sending an indicator of a reduced size of the receive window to the source of the set of packets.

2. A method of splicing Transmission Control Protocol (TCP) sockets on a computing device that processes a kernel of an operating system, the method comprising:
   receiving a set of packets at a first TCP socket of the kernel;
   storing the set of packets at a kernel memory location;
   sending the set of packets directly from the kernel memory location out through a second TCP socket of the kernel, the kernel memory location comprising a location of a buffer of a particular size;
   sending an indicator of a receive window size of the first TCP socket to a source of the set of packets;

when the buffer is full, sending an indicator that the receive window size is zero to the source of the set of packets.

3. The method of claim 2, wherein the indicator is a first indicator, the method further comprising:
emptying the buffer by sending packets from the second TCP socket; and
sending a second indicator that the receive window size is no longer zero.

4. The method of claim 1 wherein the set of packets is a first set of packets, the method further comprising waiting for the first set of packets to be sent by the second TCP socket before allowing a second set of packets to be received by the first TCP socket.

5. The method of claim 4, wherein the kernel memory location comprises a set of memory pages, the method further comprising freeing the memory pages with a driver completion handler after the pages are sent.

6. The method of claim 1, wherein:
the first TCP socket writes data comprising the set of packets to the kernel memory location upon first receiving the set of packets, and
the second TCP socket reads the data from the same kernel memory location.

7. The method of claim 1, wherein the receiving, storing, and sending are performed without a system call.

8. A non-transitory machine readable medium storing a program which when executed by at least one processing unit splices sockets on a computing device that processes a kernel of an operating system, the program comprising sets of instructions for:
receiving a set of packets at a first socket of the kernel;
storing the set of packets at a kernel memory location;
sending the set of packets directly from the kernel memory location out through a second socket of the kernel, the kernel memory location comprising a location of a buffer of a particular size;
sending an indicator of a receive window size of the first socket to a source of the set of packets;
when the buffer is full beyond a threshold level, sending an indicator of a reduced size of the receive window to the source of the set of packets.

9. A non-transitory machine readable storing a program which when executed by at least one processing unit splices sockets on a computing device that processes a kernel of an operating system, the program comprising sets of instructions for:
receiving a set of packets at a first socket of the kernel;
storing the set of packets at a kernel memory location;
sending the set of packets directly from the kernel memory location out through a second socket of the kernel, the kernel memory location comprising a location of a buffer of a particular size;
sending an indicator of a receive window size of the first socket to a source of the set of packets;
when the buffer is full, sending an indicator that the receive window size is zero to the source of the set of packets.

10. The non-transitory machine readable medium of claim 9, wherein the indicator is a first indicator, the program further comprising sets of instructions for:
emptying the buffer by sending packets from the second socket; and
sending a second indicator that the receive window size is no longer zero.

11. The non-transitory machine readable medium of claim 8 wherein the set of packets is a first set of packets, the program further comprising a set of instructions for waiting for the first set of packets to be sent by the second socket before allowing a second set of packets to be received by the first socket.

12. The non-transitory machine readable medium of claim 11, wherein the kernel memory location comprises a set of memory pages, the program further comprising a set of instructions for freeing the memory pages with a driver completion handler after the pages are sent.

13. The non-transitory machine readable medium of claim 8, wherein:
the first socket writes data comprising the set of packets to the kernel memory location upon first receiving the set of packets, and
the second socket reads the data from the same kernel memory location.

14. The non-transitory machine readable medium of claim 8, wherein the sets of instructions for receiving, storing, and sending are performed without a system call.

* * * * *